United States Patent Office 3,084,106
Patented Apr. 2, 1963

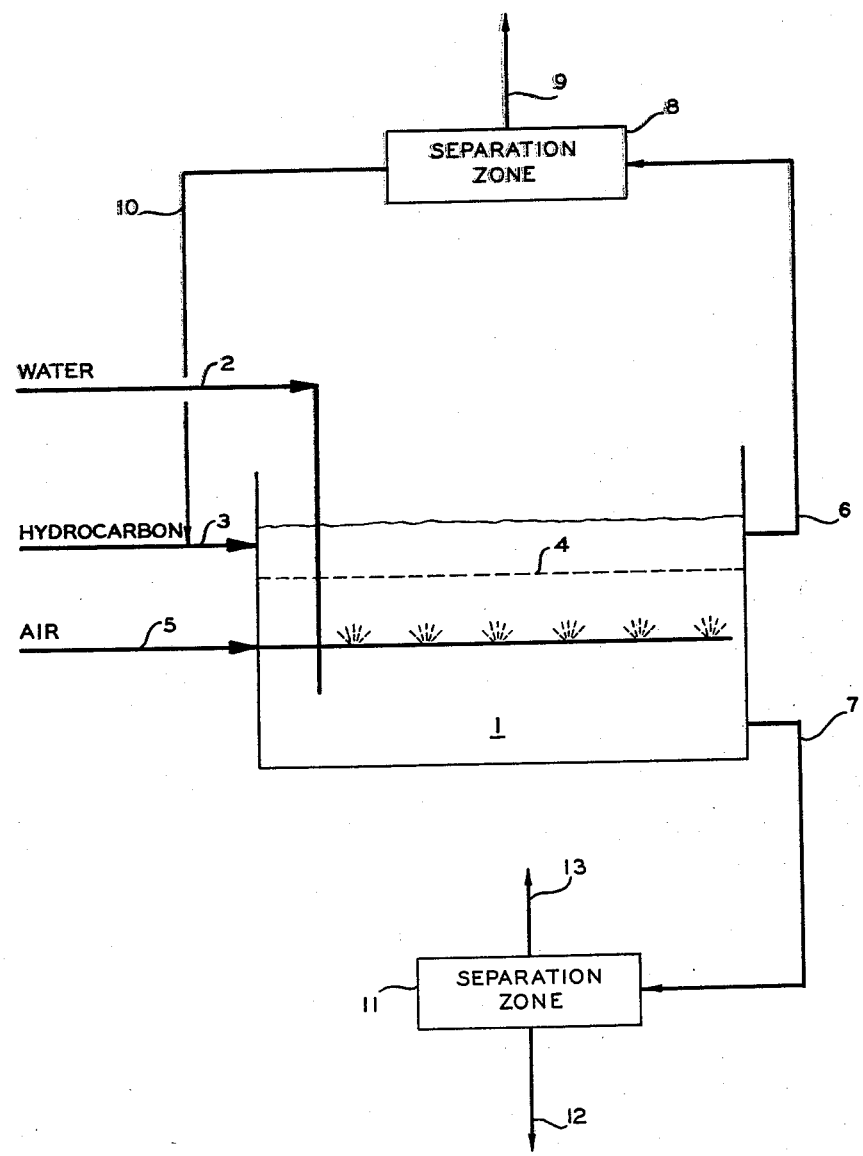

3,084,106
CONVERSION OF HYDROCARBONS BY
GIBBERELLA FUJIKUROI
Donald O. Hitzman and Ann M. Mills, Bartlesville, Okla., assignors to Phillips Petroleum Company, a corporation of Delaware
Filed Mar. 11, 1960, Ser. No. 14,473
9 Claims. (Cl. 195—51)

This invention relates to a process for the conversion of hydrocarbons. In one aspect, the invention relates to a process for the production of oxygenated derivatives of hydrocarbons. In another aspect, the invention relates to the production of organic acids and their derivatives which are capable of stimulating the growth of plants.

In the prior art processes of producing gibberellin and/or gibberellic acids, it has been customary to provide glycerols, molasses, glucose and the like as nutrients for *Gibberella fujikuroi* or *Fusarium moniliforme*. It should be noted that these nutrients are all relatively expensive in price. Since the nutrient materials are only partly utilized by the molds and the water soluble nutrients complicate subsequent recovery steps in reclaiming the water soluble gibberellic acids, these processes are obviously limited to small scale batches.

The problem of recovering gibberellin and/or gibberellic acids is emphasized when it is noted that maximum yields in the range of 500 mg. per liter have been reported. On the other hand concentrations of gibberellins as low as 1 p.p.m. causes greatly accelerated growth in most plants. Therefore, it is advantageous to provide an inexpensive continuous process for the production of gibberellin and/or gibberellic acids.

It is an object of this invention to provide a process for the production of gibberellic acid and related water soluble plant stimulants using hydrocarbon as a nutrient.

It is another object of this invention to provide a process in which the nutrient and hydrocarbon extractable by-products are not in the substrate which contains gibberellin and/or gibberellic acid, and hence, do not present complicated separation and recovery problems.

Other objects, advantages, and features of our invention will be readily apparent to those skilled in the art from the following description and appended claims.

We have found that *Gibberella fujikuroi* when added to sterile-aerated water covered by an oil layer generates in the water phase gibberellin and/or gibberellic acid-like substances capable of altering the rate of plant growth while producing oil soluble oxygenated compounds which are recoverable from the oil phase. The oil acts as a nutrient for *Gibberella fujikuroi*. Crude oil may be employed as a nutrient and in addition various untreated liquid hydrocarbon fractions such as kerosene, heavy naphthas, aromatic solvent naphthas, petroleum pitches and tars, coke oven pitch and tar and various distillation residues, asphalts and the like are also utilizable. Unsaturation in the hydrocarbon molecule provides an ideal point of attack in the assimilation of the hydrocarbon by the mold.

The use of crude oil as a nutrient is an economic saving over customarily employed nutrient used in the prior art. In addition, crude oil will form a protective blanket on the surface of the substrate permitting the adaptability of the process to large uncovered earthen or concrete tanks. Alcohols, aldehydes, acids and ketones are produced in the oil phase during the process. These products may be removed from the oil phase by fractionation, solvent extraction, and other well-known methods of separation. To complete the process, the water phase can be treated by various separation methods to form gibberellic acid concentrates or the crystalline acid or acid salts may be recovered. A conventional process involves the extraction of the water phase with an absorbent such as charcoal, eluting the absorbent with acetone, concentrating and extracting the eluate with ethyl acetate, extracting the ethyl acetate solution with a phosphate buffer and adjusting the pH with hydrochloric acid, extraction with ethyl acetate and concentrating the solution to obtain gibberellic acid.

In a principal use of gibberellic acid and/or gibberellin, the water phase is added directly to irrigation water or utilized as a spray on plants and trees to promote growth. Some agricultural plants which have responded to gibberellic acid are barley, beans, celery, and apples. The inventive process has further application in that sulfur and nitrogen are removed from the oil phase, thus treating and thereby increasing the value of the oil.

The nature of the products formed during the process ideally suit the process to continuous operation. The oil extractable products are readily removed in the oil phase and the water-soluble products, previously noted, are removed with the water phase. This has a distinct advantage over previously used processes in that the separation of the gibberellic acid and/or gibberellin products from the water-soluble nutrient and other side products was difficult to effect.

The drawing is a schematic diagram of the inventive process.

To better understand the inventive process reference is made to the drawing. In the diagram, tank 1 is charged with sterile water by way of line 2, an oil layer is charged to the tank by way of line 3. Air is introduced through line 5 beneath the oil/water interface 4 to cause agitation and intermediate mixing of the two phases in a zone adjacent the interface 4. The introduction of air may be continuous or intermittent, providing that sufficient oxygen is continuously present to promote mold growth, and dispersion of the air can be aided by the use of porous carbon blocks through which the air is forced. *Gibberella fujikuroi* is added to the water phase. When mold growth has been established and maintained for a time sufficient to build up appreciable concentration of gibberellic acids in the aqueous phase and of the various oxygenated compounds in the oil phase, withdrawal of the oil phase through line 6 and of the water phase through line 7 is started at a rate sufficient to remove the products being formed. Preferably the concentration of gibberellic acid and/or gibberellin in the water phase is at least 50 milligrams/liter. The approximate time required to reach this concentration is in the range from 20 to 40 days. At this point, oil is continuously introduced through line 3 and water is continuously added through line 2 so that the concentration of the various products can be maintained essentially constant.

As previously noted the alcohols, aldehydes, acids and ketones present in the oil phase can be removed by fractionation, solvent extraction, and other well-known methods of separation. The hydrocarbon stream is passed through line 6 to a separation zone 8. The oxygenated products are removed through line 9. The residual oil from the recovery step can then be returned to the fermentation zone through line 10 if desired. The water phase can be treated by various separation methods to form gibberellic acid concentrates or the crystalline acid or acid salts may be recovered. The water phase is passed through line 7 to a separation zone 11. Water is removed through line 13 and gibberellic acid concentrates recovered through line 12.

The following specific examples are intended to illustrate the improvements which can be realized by operating according to the inventive process. However, it is not intended that our invention should be limited to the specific examples shown.

*Example I*

18 liters of sterile water containing 180 milliliters of ethanol was inoculated with 5 cc. of a 24 hour culture of *Gibberella fujikuroi*. The culture was maintained in a 5-gallon, air-agitated bottle. Sufficient air was passed through the water phase to insure the continuous presence of oxygen in the water phase. The cultivation process was conducted under conditions of room temperature and atmospheric pressure. After 35 days, growth developed and infrared analysis revealed the presence of gibberellin and/or gibberellic acid.

*Example II*

100 milliliters of water containing 3 milliliters of glycerol and inoculated with 5 cc. of a 24 hour culture of *Gibberelli fujikuroi* was agitated by aeration as in Example I. The cultivation process was conducted under conditions of room temperature and atmospheric pressure. After 35 days, growth was apparent and subsequent infrared analysis of the culture revealed the presence of gibberellin and/or gibberellic acid.

*Example III*

To 18 liters of sterile water inoculated with 5 cc. of a 24 hour culture of *Gibberelli fujikuroi* contained in a 5-gallon bottle was added 200 milliliters of untreated Burbank crude oil. Contents of the bottle were maintained at room temperature and were agitated by aeration as in Example I. After 30 days, growth was obtained in the oil/water interface and on the bottom of the bottle. Infrared analysis of the aqueous phase established the presence of gibberellin and/or gibberellic acid. Analysis of the oil phase established the presence of unidentified acids, alcohols, aldehydes and/or ketones.

Example III illustrates that *Gibberelli fujikuroi* which is a preferred producer of gibberellic acid in processes utilizing alcohols, molasses and the like can also be grown on crude oil. As an abundance of nutrient was present in each case, it is readily apparent that the mold prefers crude oil to the other nutrients in that growth was observed in only 30 days, whereas 35 to 45 days was the time required in other cultures.

As will be evident to those skilled in the art, various modifications of this invention can be made or followed, in the light of the foregoing disclosure and discussion without departing from the spirit or scope thereof.

We claim:

1. A process for the conversion of a normally liquid hydrocarbon into oxygen-containing compounds which comprises establishing a two phase system consisting of a liquid hydrocarbon phase above a water phase in a conversion zone, inoculating said water phase with *Gibberella fujikuroi*, passing air into said water phase, and cultivating the mold *Gibberella fujikuroi*.

2. A process for the conversion of a normally liquid hydrocarbon into oxygen-containing compounds which comprises establishing a two phase system consisting of a liquid hydrocarbon phase above a water phase in a conversion zone, inoculating said water phase with *Gibberella fujikuroi*, passing air into said water phase, cultivating the mold *Gibberella fujikuroi*, withdrawing said water phase containing organic acids, and separating said organic acids from said water.

3. A process for the conversion of a normally liquid hydrocarbon into oxygen-containing compounds which comprises establishing a two phase system consisting of a liquid hydrocarbon phase above a water phase in a conversion zone, inoculating said water phase with *Gibberella fujikuroi*, passing air into said water phase, cultivating the mold *Gibberella fujikuroi*, withdrawing said hydrocarbon phase containing oxygen derivatives of said hydrocarbon, separating said derivatives from said hydrocarbon, withdrawing said water phase containing organic acids, separating said organic acids from said water.

4. A process for the conversion of a normally liquid hydrocarbon into oxygen-containing compounds which comprises establishing a two phase system consisting of a liquid hydrocarbon phase above a water phase in a conversion zone, inoculating said water phase with *Gibberella fujikuroi*, passing air into said water phase, cultivating the mold *Gibberella fujikuroi* until a desired concentration of at least one member selected from the group consisting of gibberellic acid and gibberellin is obtained in said water phase, continuously withdrawing said hydrocarbon phase containing oxygenated derivatives of said hydrocarbon, separating said derivatives from said hydrocarbon, continuously withdrawing said water phase containing at least one member selected from the group consisting of gibberellic acid and gibberellin, separating said at least one member selected from the group consisting of gibberellic acid and gibberellin from said water, and continuously adding hydrocarbon feed and water to said conversion zone so as to maintain the concentration of gibberellic acid and gibberellin in said water phase substantially constant.

5. The process of claim 4 wherein the concentration of gibberellic acid and gibberellin in the water phase is at least 50 milligrams per liter.

6. The process of claim 5 wherein the cultivation period is in the range from 20 to 40 days.

7. The process of claim 4 wherein the hydrocarbon employed is selected from the group consisting of crude oil, untreated kerosene, heavy naphthas, aromatic solvent naphthas, and fuel oil.

8. The process of claim 4 wherein the hydrocarbon employed is crude oil.

9. The process of claim 4 wherein the hydrocarbon separated from the oxygenated derivatives is recycled to said conversion zone.

References Cited in the file of this patent

UNITED STATES PATENTS

| | | |
|---|---|---|
| 2,697,062 | Cramer | Dec. 14, 1954 |
| 2,906,671 | Borrow et al. | Sept. 29, 1959 |